March 3, 1970  L. E. MEEK  3,498,236
SELF-PROPELLED CABLE SUPPORTED CARRIAGE
Filed March 12, 1968  3 Sheets-Sheet 1

FIG. I.

INVENTOR
LONNIE E. MEEK
BY
ATTORNEYS

INVENTOR
LONNIE E. MEEK
ATTORNEYS

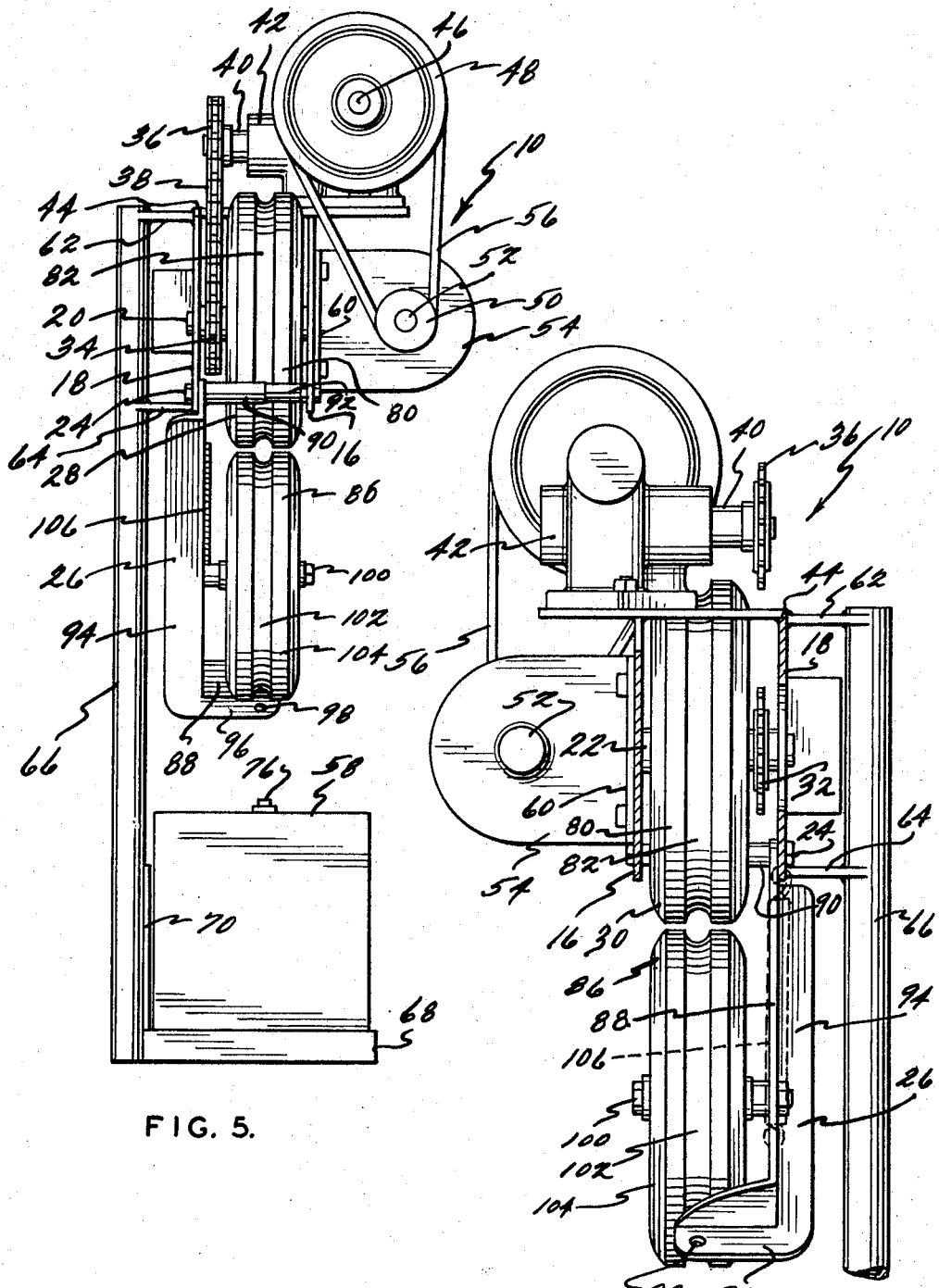

United States Patent Office 3,498,236
Patented Mar. 3, 1970

3,498,236
SELF-PROPELLED CABLE SUPPORTED CARRIAGE
Lonnie E. Meek, Box 827, Meeker, Colo. 81641
Filed Mar. 12, 1968, Ser. No. 712,461
Int. Cl. B61c 11/02, 13/06; B61b 7/06
U.S. Cl. 105—30                                     6 Claims

ABSTRACT OF THE DISCLOSURE

This invention relates to a self-contained and self-propelled line-stringing block that is driven by a battery-powered electric motor, both of which are carried by the frame. A longitudinally-aligned pair of circumferentially-grooved drive-wheels ride atop a previously-strung aerial tramway cable or the like, while a third idler-wheel aligned therebeneath holds said drive-wheels in rolling frictional contact with the cable. The idler-wheel is mounted on a pivoted arm that is spring-biased upwardly and also carries the wire or cable to be strung, the latter functioning as a tensioning device that provides the primary upward bias to said idler-wheel.

---

Traveling line-stringing blocks of one type or another are quite old in the art, most of them having been developed for the purpose of stringing telephone and telegraph lines between the cross bars of line poles after one conductor has already been strung in some other fashion, usually manually. In all such devices, the one forming the subject matter of the instant application being no exception, one such cable or conductor must already be in place to provide the trolley wire used to support the traveling stringing block or aerial cable carrier. Due to the relatively short spans covered by the prior art units, most of them were drawn across from support to support by hand instead of being self-propelled. Also, since the length of cable strung was relatively short, it produced little drag that would cause the traveling block to slip and fail to reach the terminal support. Of course, if it was pulled across as was usually the case, slippage was no problem at all and about the only refinement needed was some means for keeping the pulley or pulleys from leaving the cable.

For the most part, however, the prior art traveling line-stringing blocks were ill-suited for use in hauling lines between widely separated supports such as, for example, aerial tramways, ore haulage systems and the like, that have to span the distance separating the walls of a canyon or gorge. Pulling the hauling apparatus and cable attached thereto across manually is out of the question because of the substantial weight involved and the inherent slack in the trolley cable that results in one having to lift the carrier and hauled cable up a successively steeper incline as it approaches the terminals. Of course, a powered winch could be used for this purpose but, to do so, introduces further complications rather than solving them because one is faced with the situation of having to get the winch cable across initially, thus demanding a second winch. At this point, the traveling line-carrier can be dispensed with altogether as the two winches can be used to haul cable back and forth independent of a previously-strung trolley cable, but with considerably greater effort and expense.

The critical factor, therefore, is to provide the line-stringing apparatus with sufficient self-contained power and frictional contact with the trolley line to enable it to climb to the terminal with the hauled cable trailing therebehind. Speed is not essential so one can gear down even a small drive-motor so as to develop the required power rather easily. The slippage problem, on the other hand, is not easily solved because extremely tight rolling frictional contact must be maintained at all times between the drive-sheaves and trolley cable if the unit is to be capable of climbing up the trolley cable as it nears the terminal with nearly the entire span of hauled cable stretching out therebehind.

It has been found that the combined weight of the hauled cable and haulage apparatus is insufficient to prevent slippage. The same is true of using spring-bias to hold the drive-sheaves in rolling frictional contact with the trolley cable. Accordingly, the prior art cable-stringing devices have proven quite inadequate for stringing wires, cables and the like across long spans between terminals.

In accordance with the teaching of the instant invention, a simple yet novel solution to the problem of maintaining adequate rolling frictional contact with the trolley cable has been found and it consists of the unobvious expedient of so mounting the idler-wheel that the drag of the hauled cable attached thereto provides the force necessary to all but completely eliminate slippage. While a tension spring is used to keep the idler-wheel in continuous engagement with the underside of the trolley cable, its bias is insufficient by itself to maintain the required rolling friction of the drive-wheels and, therefore, its function is a supplementary one, namely, to keep the drive-wheels on the trolley cable during momentary relaxations in the tension applied to the hauled cable and during the early stages of the stringing operation where the stringing unit is traveling essentially "downhill" and the drag developed by the hauled cable is of little practical significance.

Accordingly, it is the principal object of the present invention to provide a novel and improved self-propelled traveling line-stringing block.

A second objective is the provision of a unit of the type aforementioned that utilizes the drag developed in the hauled cable to apply the force necessary to prevent drive-wheel slippage on the trolley cable.

Another object of the invention is to provide a cable-stringing apparatus that carries its own self-contained power supply in the form of an ordinary automobile storage battery.

Still another objective of the invention herein disclosed and claimed is to provide a traveling line block wherein the idler-wheel urges a section of the trolley cable up into the space left between the two longitudinally-spaced drive-wheels so as to increase the arc of frictional contact between the latter and said cable.

An additional object is to provide an aerial tramway-type cable-stringing apparatus that has its center of mass located well beneath the trolley line so as to remain stable in upright position, even under adverse conditions such as excessive cable sway and crosswinds.

A further object is to provide a line-stringing apparatus that is portable, relatively lightweight, compact, rugged, easy to service, simple to use, versatile and especially well-suited for use in stringing cable between widely separated terminals.

Other objects will be in part apparent and in part pointed out specifically hereinafter in connection with the description of the drawings that follows, and in which:

FIGURE 1 is a side elevation of the line-stringing apparatus of the present invention showing same mounted on a previously-strung trolley cable with the line to be hauled attached thereto;

FIGURE 5 is a front elevation of the unit; and

FIGURE 6 is a fragmentary section to an enlarged scale taken along line 6—6 of FIGURE 1.

Figure 2:
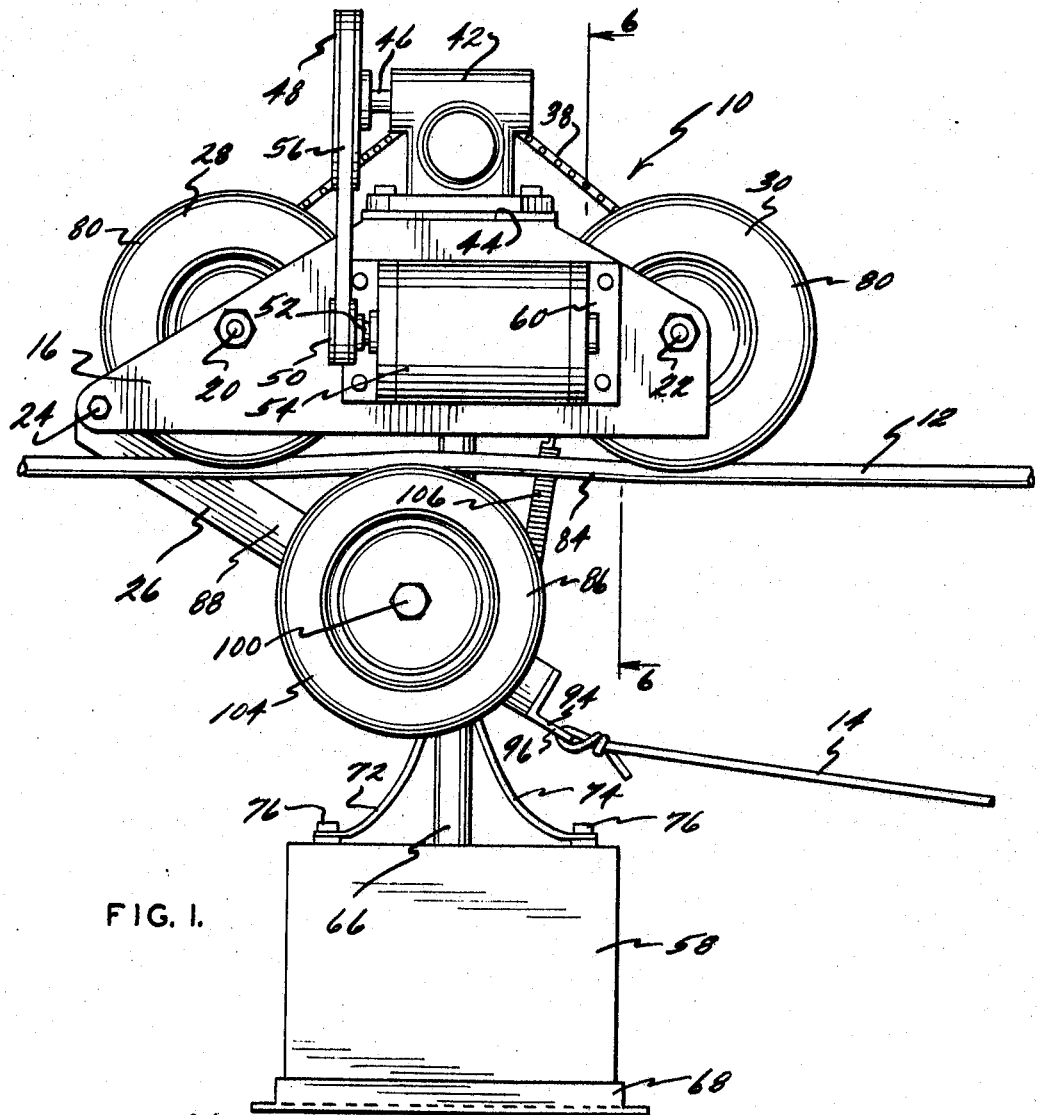
FIGURE 2 is a top plan view thereof.
Figure 3:
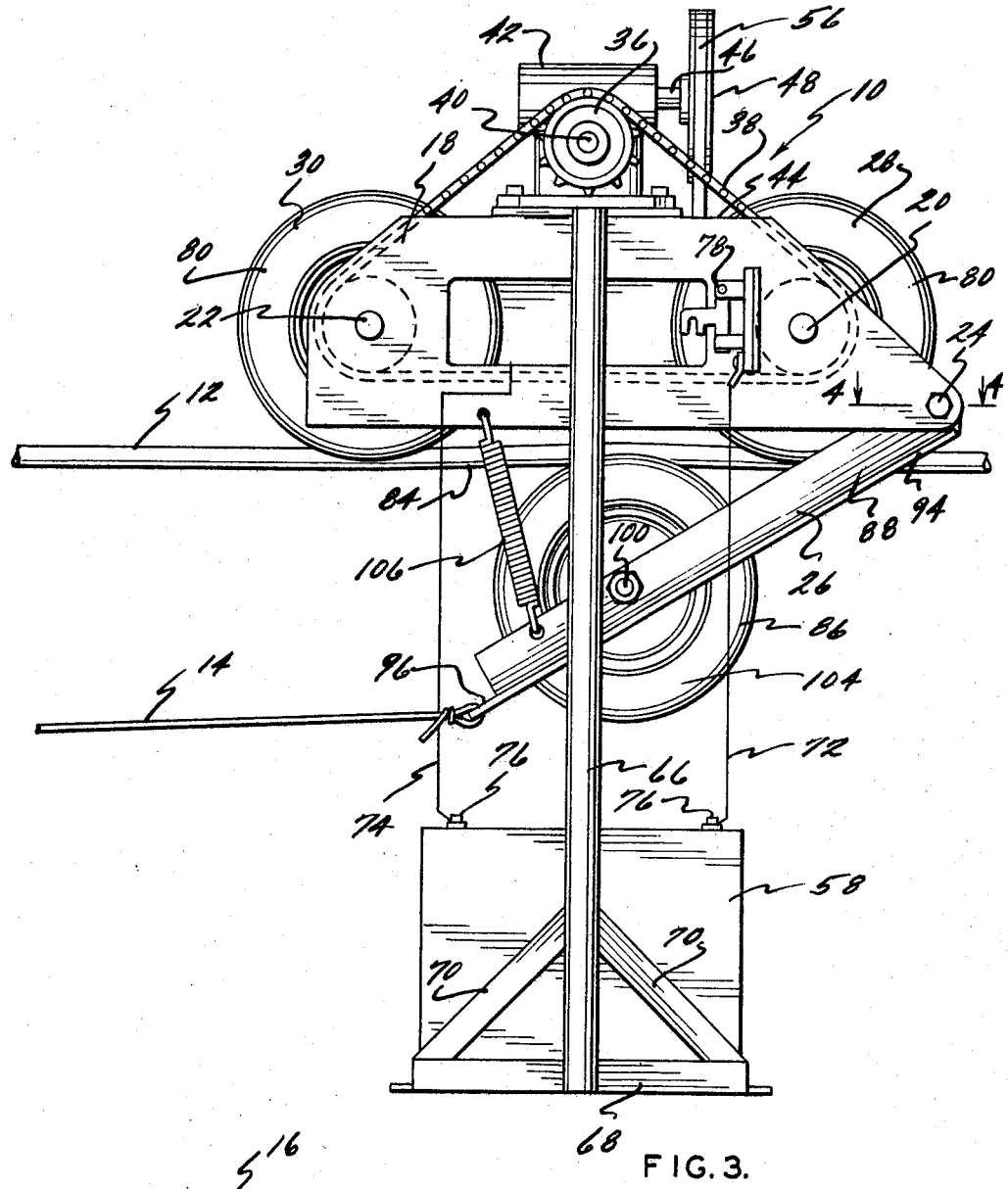
FIGURE 3 is a side elevation similar to FIGURE 1 except that it shows the opposite side.
Figure 4:
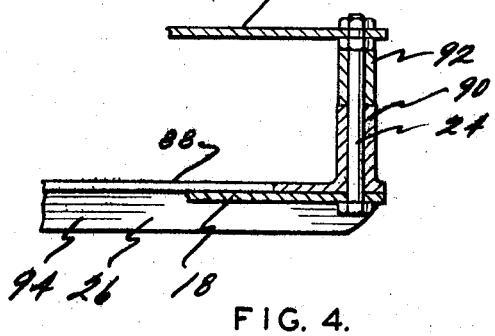
FIGURE 4 is a fragmentary section taken along line 4—4 of FIGURE 3 showing the pivotal mounting of the idler-wheel support arm.

Referring now to the drawings for a detailed description of the present invention and, initially, to all but FIGURE 4 for this purpose, the line-stringing apparatus has been generally designated by numeral 10, and it will be seen in FIGURES 1 and 3 to be suspended for rolling movement on what, for purposes of the present description, will be referred to as a "trolley" cable 12 in order to distinguish same from the cable being strung 14. Trolley cable 12 must, of course, already be strung in place between the spaced terminals (not shown) as it provides the track or rail upon which apparatus 10 rides while hauling line 14 across the gap therebetween. In the particular form shown, the trolley cable 12 is considerably larger than the wire or cable 14 being strung and this may or may not be the situation that exists in actual use. Of necessity, the trolley cable must be capable of supporting its own weight as well as that of the stringing apparatus and the cable 14 towed thereby. Needless to say, a small gauge insulated electrical conductor will seldom possess the tensile strength to perform the above function over a long span.

A pair of transversely-spaced generally-triangular side plates 16 and 18 are held in parallel relation by drive-wheel shafts 20 and 22, along with pin 24 that pivotally-mounts idler-wheel support arm 26. Shafts 20 and 22 are journaled for rotation in horizontally-spaced parallel relation to one another between said side plates and the drive-wheels 28 and 30 are mounted thereon for conjoint rotation therewith. Each of these shafts also carries a sprocket gear 32 and 34 which are operatively-interconnected to one another and to a third sprocket gear 36 positioned above and between the latter in alignment therewith by sprocket chain 38. The latter sprocket is fastened to the output shaft 40 of speed reducer 42 which is mounted across the horizontally-truncated top edges 44 of the side plates. The input shaft 46 of said reducer, which rotates at right angles to the output shaft, carries a pulley 48 operatively-connected to pulley 50 on the drive-shaft 52 of electric motor 54 by V-belt 56. Motor 54 is a direct-current energized type preferably powered by an ordinary 6 or 12 volt storage battery 58. The motor has the mounting flanges 60 thereof bolted or otherwise attached to the outside of side plate 16 so as to place pulley 50 in vertical alignment with its companion pulley 48.

On the other side of the frame attached to side plate 18 are a pair of vertically-aligned brackets 62 and 64 that are welded to post 66 which extends downward vertically therefrom to a position well below the trolley cable 12. Affixed to the lower end of post 66 is a horizontally-disposed rectangular battery-support platform 68 which projects from the inside of said post laterally underneath the drive-wheels as shown most clearly in FIGURE 5. This platform is fabricated from angle iron, the horizontal flanges of which support the battery case while the vertical flanges keep it from moving from side-to-side. A pair of diagonal struts 70 extend downwardly from the post to horizontally-spaced points on the platform. The battery cables 72 and 74 extend from the terminals 76 up the post to motor 54, the positive cable being connected thereto through a knife switch 78 fastened to side plate 18 as shown in FIGURE 3. A lanyard (not shown) can be fastened to this knife switch which will engage a stop at the terminal to open same and shut off the motor or, if preferred, this can be done manually. Thus, motor 54 powered by battery 58 is operatively-connected to the speed reducer by a conventional belt and pulley power transfer mechanism, and said reducer is similarly connected in driving relation to both drive-wheels 28 and 30 so as to turn the latter continuously in the same direction and at the same speed.

Now, a look at FIGURES 1 and 3 will reveal that the drive-wheels 28 and 30 are of the rubber-tired type wherein the tires 80 are each provided with semi-circular circumferential grooves 82 centered transversely thereof. These grooves are preferably sized to closely receive the trolley cable 12 and form good frictional contact therewith. The longitudinal spacing of the drive-wheels leaves a section of the trolley cable 84 therebetween for engagement by idler-wheel 86.

Briefly, with reference to FIGURE 4, the manner in which idler-wheel support arm 26 is pivotally-mounted on pin 24 will be described. The arm itself is shown as being fabricated from a length of angle iron wherein the vertical flange 88 thereof has an opening in one end thereof and a right angle sleeve 90 welded thereto in alignment with said opening that provides a bearing for said arm on pin 24. A short spacer 92 spans the gap left between the end of sleeve 90 and the opposite side plate 18. The lateral flange 94 of arm 26 projects transversely underneath the bottom edge of the side plate 18, while the vertical flange 88 lies flush against the inside surface thereof. Thus, arm 26 is pivotally-attached to pin 24 for swinging motion in a vertical plane about a horizontal axis paralleling the axes of rotation of the drive-wheels located beneath, but slightly forward of, the latter at the lower front corner of the frame defined by the rectangular side plates.

Once again referring to FIGURES 1–3, 5 and 6, arm 26 will be seen to have a right angle dogleg 96 in the free end thereof that extends across the vertical plane passing through the aligned circumferential grooves 82 in the drive-wheels 28 and 30. In the lateral flange 94 of this dogleg is an opening 98 into which is fastened the lead end of the line being strung 14. This opening 98 is, once again, aligned vertically with the circumferential grooves 82 so that the pull exerted on line 14 is directly beneath trolley cable 12.

Spaced inwardly of dogleg 96 on arm 26 a distance slightly greater than the radius of idler-wheel 86 is its axle 100 which lies in spaced parallel relation below and behind pivot pin 24. Idler-wheel 86 is journaled for rotation on axle 100 such that the circumferential groove 102 in its tire 104 lines up vertically in the same plane as the similar grooves 82 in the drive-wheels. A heavy-duty tension spring 106 interconnects arm 26 with plate 18 normally biasing the idler-wheel up against the section of trolley cable 84 lying between the areas of contact thereof with the drive-wheels. It will be apparent that the more the idler-wheel deflects cable section 84 upwardly with both ends of the trolley cable 12 under tension, the greater the arc of contact that said cable makes with the grooves of the drive-wheels. Obviously, the greater the arc of contact with the drive-wheels, the better the frictional engagement between these wheels and the cable that is available to haul the cable 14 across from one terminal to the other. Now, spring 106 is ordinarily incapable of exerting the substantial upward force on the idler-wheel needed to keep the drive-wheels from slipping on the trolley cable. This is especially true during the latter stages of the trip between terminals when the unit must climb uphill due to the slack in the trolley cable and, in addition, haul along at least half of the cable being strung. By fastening the cable being strung onto the free end of arm 26 and keeping it under tension, especially during the latter stages of the journey, idler-wheel 86 is biased even more tightly up against cable section 84 so as to eliminate virtually all slippage. To increase frictional contact, it is only necessary to pull back on cable 14, thus increasing the tension thereon as well as the upward bias on the idler-wheel. The resulting unit is extremely stable and well balanced with the heavy battery providing considerable ballast centered below both cables.

Having thus described the several useful and novel features of the line-stringing block of the instant invention, it will be seen that the several worthwhile objectives for which it was developed have been achieved. Although but a single specific embodiment has been illustrated, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. A self-propelled traveling block of the type adapted to ride a trolley cable and haul a line from one terminal to another which comprises: a frame including a pair of longitudinally-extending side frame members arranged in transversely-spaced parallel relation, a pair of rubber-tired circumferentially-grooved drive-wheels journalled for rotation between the side frame elements in aligned longitudinally-spaced relation about parallel axes lying in a common horizontal plane, self-contained drive means carried by the frame, power transmission means interconnecting the drive means and drive-wheels operative to turn the latter in the same direction and at the same speed, a downwardly and rearwardly inclined arm pivotally-attached to the forward end of the frame for movement in a vertical plane alongside the drive-wheels about a horizontal axis paralleling their axes of rotation, and a rubber-tired circumferentially-grooved idler-wheel journaled for rotation intermediate the ends of said arm about a horizontal axis lying below and between those of the drive-wheels in parallel relation thereto, said idler-wheel being positioned and adapted to engage the underside of a trolley cable atop which the drive-wheels are riding and hold same in tight rolling frictional contact therewith upon attachment of the lead end of the line being strung to the rear end of said arm and pulling rearwardly thereon so as to raise the latter along with said idler-wheel into operative position.

2. The self-propelled traveling line-stringing block as set forth in claim 1 in which: a tension spring interconnects the frame and arm at a point spaced rearwardly of the axis of pivotal movement of the latter, said spring being adapted to normally bias the idler-wheel upwardly into contact with the trolley cable.

3. The self-propelled traveling line-stringing block as set forth in claim 1 in which: the power transmission means includes a speed reducer carried by the frame having an input shaft connected to receive power from the self-contained drive means and an output shaft operatively connected to the drive-wheels.

4. The self-propelled traveling line-stringing block as set forth in claim 1 in which: the frame includes a vertically-disposed post attached to one of the side frame members extending downwardly beneath the idler-wheel and a horizontally-disposed battery-support platform attached to the lower end of the post extending across beneath said idler-wheel, and in which the self-contained drive means comprises a battery-powered electric motor carried by the frame and a storage battery mounted on the battery-support platform operatively connected to said electric motor.

5. The self-propelled traveling line-stringing block as set forth in claim 3 in which: switch means are interposed between the storage battery and electric motor operative upon actuation to energize and deenergize the latter.

6. The self-propelled traveling line-stringing block as set forth in claim 3 in which: the power transmission means comprises a speed reducer carried by the frame having an input shaft connected to receive power from the electric motor and an output shaft operatively connected to the drive-wheels.

References Cited

UNITED STATES PATENTS

| | | | |
|---|---|---|---|
| 1,711,401 | 4/1929 | Baldwin et al. | 105—50 |
| 3,194,178 | 7/1965 | Weston | 105—30 XR |
| 3,238,895 | 3/1966 | Oswald | 105—50 XR |
| 3,439,628 | 4/1969 | Mendelson | 105—50 |

ARTHUR L. LAPOINT, Primary Examiner

H. BELTRAN, Assistant Examiner

U.S. Cl. X.R.

105—50, 51, 153